(12) United States Patent
Georgin (10) Patent No.: US 10,293,923 B2
(45) Date of Patent: May 21, 2019

(54) ROBUSTNESS AND AVAILABILITY OF AIRCRAFT ACCELERATION EVALUATION

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 95 days.

(21) Appl. No.: 14/876,541

(22) Filed: Oct. 6, 2015

(65) Prior Publication Data
US 2017/0096218 A1 Apr. 6, 2017

(51) Int. Cl.
| | | |
|---|---|---|
| *B64C 25/42* | (2006.01) | |
| *B60T 8/17* | (2006.01) | |
| *B60T 8/172* | (2006.01) | |
| *B64C 13/16* | (2006.01) | |
| *B64D 47/00* | (2006.01) | |

(52) U.S. Cl.
CPC ........... *B64C 25/426* (2013.01); *B60T 8/172* (2013.01); *B60T 8/1703* (2013.01); *B64C 13/16* (2013.01); *B64D 47/00* (2013.01); *B60T 2210/36* (2013.01); *B60T 2270/413* (2013.01)

(58) Field of Classification Search
CPC ........ B60T 8/321; B60T 8/325; B60T 8/1703; B60T 8/172; B60T 2210/36; B60T 2270/413; B64C 25/426; B64C 13/16; B64D 47/00
See application file for complete search history.

(56) References Cited

U.S. PATENT DOCUMENTS

| | | | | |
|---|---|---|---|---|
| 4,455,820 | A * | 6/1984 | Buckley, Jr. | F02C 9/28 60/39.281 |
| 5,208,754 | A * | 5/1993 | Nakaura | B60T 8/172 180/197 |
| 5,307,274 | A * | 4/1994 | Takata | B60G 17/01908 701/70 |
| 6,513,885 | B1 * | 2/2003 | Salamat | B60T 8/1703 303/122.09 |
| 7,835,845 | B2 * | 11/2010 | Lin | B60T 7/042 180/290 |
| 9,233,763 | B1 * | 1/2016 | Chen | G05B 23/0235 |

(Continued)

FOREIGN PATENT DOCUMENTS

| | | |
|---|---|---|
| EP | 1403159 | 3/2004 |
| WO | 02055356 | 7/2002 |
| WO | WO 2015/036520 | 3/2015 |

OTHER PUBLICATIONS

Extended European Search Report dated Feb. 3, 2017 in European Application No. 16192422.0.

*Primary Examiner* — Thomas E Worden
(74) *Attorney, Agent, or Firm* — Snell & Wilmer L.L.P.

(57) ABSTRACT

A system for determining a deceleration rate of an aircraft, in various embodiments, includes at least one component capable of transmitting a first deceleration rate. The system also includes a brake control unit coupled to the at least one component and having a brake controller that is configured to receive the first deceleration rate from the at least one component and to determine a likely accurate deceleration rate based on the first deceleration rate, a second deceleration rate and a hierarchy of sources of deceleration rates.

4 Claims, 4 Drawing Sheets

(56) References Cited

U.S. PATENT DOCUMENTS

| | | | | |
|---|---|---|---|---|
| 2008/0071452 A1* | 3/2008 | Tan | ............... | B60T 8/172 701/70 |
| 2010/0102173 A1* | 4/2010 | Everett | ............... | B60T 8/1703 244/175 |
| 2010/0106347 A1* | 4/2010 | Cahill | ............... | B64C 25/44 701/3 |
| 2010/0292952 A1* | 11/2010 | Pomper | ............... | G01J 5/02 702/135 |
| 2011/0178685 A1* | 7/2011 | Vandekerhove | ............... | B60T 8/172 701/51 |
| 2011/0295457 A1* | 12/2011 | Linda | ............... | B60T 8/172 701/498 |
| 2012/0109424 A1* | 5/2012 | Fervel | ............... | B64C 13/42 701/3 |
| 2012/0209476 A1* | 8/2012 | Andres | ............... | B60W 40/109 701/45 |
| 2013/0131890 A1* | 5/2013 | Armitage | ............... | G06F 17/00 701/1 |
| 2014/0136026 A1* | 5/2014 | Ros Perez | ............... | B64C 25/426 701/3 |
| 2014/0251833 A1* | 9/2014 | Smith | ............... | G01N 27/3274 205/782 |
| 2014/0257603 A1* | 9/2014 | McKeown | ............... | B64D 45/00 701/16 |
| 2015/0046298 A1* | 2/2015 | Zwakhals | ............... | G06Q 10/087 705/28 |
| 2015/0062936 A1* | 3/2015 | Braunberger | ............... | B62J 6/02 362/466 |
| 2016/0221663 A1* | 8/2016 | Landers | ............... | B64C 13/503 |

* cited by examiner

ROBUSTNESS AND AVAILABILITY OF AIRCRAFT ACCELERATION EVALUATION

FIELD

The present disclosure is directed to aircraft braking systems and, more particularly, to systems and methods for determining a deceleration rate of an aircraft based on one or more sensors.

BACKGROUND

Various aircraft brake systems include a brake control unit (BCU) that controls the various brakes of the aircraft. Various BCUs provide automatic deceleration of the aircraft. For example, the BCU may allow a pilot to select a deceleration rate and then control the brakes to cause the aircraft to decelerate at the selected rate. When controlling the brakes to achieve the selected deceleration rate, the BCU constantly or periodically detects a current deceleration rate and applies more or less braking force based on the detected deceleration rate. Conventional aircraft wheels include wheel speed sensors for detecting a wheel speed and BCUs are capable of determining deceleration rates based on the detected wheel speeds. Some BCUs can also receive deceleration rates from avionics units of the aircraft.

SUMMARY

A system for determining a deceleration rate of an aircraft, in various embodiments, includes at least one component capable of transmitting a first deceleration rate. The system also includes a brake controller in operable communication with the at least one component and configured to receive the first deceleration rate from the at least one component and to determine a likely accurate deceleration rate based on the first deceleration rate, a second deceleration rate and a hierarchy of sources of deceleration rates.

In any of the foregoing systems, the at least one component is an avionics unit capable of transmitting an avionics deceleration rate and the first deceleration rate is the avionics deceleration rate.

Any of the foregoing systems may also include a first accelerometer configured to detect a first accelerometer deceleration rate and the second deceleration rate is the first accelerometer deceleration rate.

Any of the foregoing systems may also include a second accelerometer configured to detect a second accelerometer deceleration rate and wherein the brake controller is further configured to determine the likely accurate deceleration rate based on the avionics deceleration rate, the first accelerometer deceleration rate and the second accelerometer deceleration rate.

In any of the foregoing systems, the brake controller is further configured to determine that the likely accurate deceleration rate is at least one of the first accelerometer deceleration rate or the second accelerometer deceleration rate in response to determining that the avionics deceleration rate is at least one of invalid or inaccurate.

In any of the foregoing systems, the brake controller is further configured to compare the avionics deceleration rate to the first accelerometer deceleration rate and the second accelerometer deceleration rate and to determine whether the avionics deceleration rate is inaccurate based on the comparison of the avionics deceleration rate to the first accelerometer deceleration rate and the second accelerometer deceleration rate.

In any of the foregoing systems, the brake controller is further configured to determine that the avionics deceleration rate is invalid in response to determining that the avionics deceleration rate is different than the first accelerometer deceleration rate and the second accelerometer deceleration rate by at least a predetermined amount.

Any of the foregoing systems can also include a first accelerometer monitor configured to detect whether the first accelerometer deceleration rate is valid and a second accelerometer monitor configured to detect whether the second accelerometer deceleration rate is valid, and wherein the brake controller is further configured to determine whether at least one of the first accelerometer deceleration rate or the second accelerometer deceleration rate is invalid.

Any of the foregoing systems can also include at least two wheel speed sensors configured to output wheel speed data including a wheel speed of a corresponding wheel. The brake controller can also determine a wheel speed deceleration rate based on the wheel speed data and can determine that the likely accurate deceleration rate is the wheel speed deceleration rate in response to determining that the first accelerometer deceleration rate and the second accelerometer deceleration rate are invalid, and that the avionics deceleration rate is at least one of invalid or inaccurate.

In any of the foregoing systems, the brake controller is further configured to determine that the likely accurate deceleration rate is the first accelerometer deceleration rate in response to determining that the second accelerometer deceleration rate is invalid, the first accelerometer deceleration rate is valid and the avionics deceleration rate is at least one of invalid or inaccurate. The brake controller can also determine that the likely accurate deceleration rate is the second accelerometer deceleration rate in response to determining that the first accelerometer deceleration rate is invalid, the second accelerometer deceleration rate is valid and the avionics deceleration rate is at least one of invalid or inaccurate.

In any of the foregoing systems, the first accelerometer includes a first X-axis accelerometer configured to detect deceleration along an X-axis extending from an aft end of the aircraft to a forward end of the aircraft and a first Y-axis accelerometer configured to detect deceleration along a Y-axis parallel to a wingspan of the aircraft. Furthermore, the second accelerometer can include a second X-axis accelerometer configured to detect deceleration along the X-axis and a second Y-axis accelerometer configured to detect an acceleration along the Y-axis.

A method according to various embodiments for determining a deceleration rate of an aircraft can include receiving, at a brake controller and from a first component, a first deceleration rate and determining, by the brake controller, a likely accurate deceleration rate based on the first deceleration rate, a second deceleration rate and a hierarchy of sources of deceleration rates.

In any of the foregoing methods, the first component is an avionics unit and the first deceleration rate is an avionics deceleration rate.

Any of the foregoing methods can also include detecting, by a first accelerometer, a first accelerometer deceleration rate and wherein the second deceleration rate is the first accelerometer deceleration rate.

Any of the foregoing methods can also include detecting, by a second accelerometer, a second accelerometer deceleration rate and wherein determining the likely accurate deceleration rate is further based on the avionics deceleration rate, the first accelerometer deceleration rate and the second accelerometer deceleration rate.

Any of the foregoing methods can also include comparing, by the brake controller, the avionics deceleration rate to the first accelerometer deceleration rate and the second accelerometer deceleration rate and determining, by the brake controller, whether the avionics deceleration rate is inaccurate based on the comparison of the avionics deceleration rate to the first accelerometer deceleration rate and the second accelerometer deceleration rate.

Any of the foregoing methods can also include determining, by the brake controller, whether the avionics deceleration rate is invalid based on receiving operational data from the avionics unit.

Any of the foregoing methods can also include comparing, by the brake controller, the avionics deceleration rate to the first accelerometer deceleration rate and the second accelerometer deceleration rate; and determining, by the brake controller, whether the avionics deceleration rate is inaccurate based on the comparison of the avionics deceleration rate to the first accelerometer deceleration rate and the second accelerometer deceleration rate.

Any of the foregoing methods can also include determining, by the brake controller, that the avionics deceleration rate is invalid in response to determining that the avionics deceleration rate is different than the first accelerometer deceleration rate and the second accelerometer deceleration rate by at least a predetermined amount.

A brake control unit (BCU) in accordance with various embodiments for use with an aircraft can include a first accelerometer configured to detect a first accelerometer deceleration rate and a second accelerometer configured to detect a second accelerometer deceleration rate. The BCU can also include a brake controller configured to receive an avionics deceleration rate from an avionics unit of the aircraft and receive the first accelerometer deceleration rate and the second accelerometer deceleration rate. The BCU can also be configured to determine whether the avionics deceleration rate is at least one of invalid or inaccurate and to generate brake control data for controlling brakes of the aircraft based on at least one of the first accelerometer deceleration rate or the second accelerometer deceleration rate in response to determining that the avionics deceleration rate is at least one of invalid or inaccurate.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or mini With reference to FIG. 1, an aircraft 100 in accordance with various embodiments can include multiple landing gear such as a landing gear 104, a landing gear 106 and a landing gear 108. The landing gear 104, 106, 108 may generally support the aircraft 100 when the aircraft 100 is not flying, allowing the aircraft 100 to taxi, take off and land without damage. Each landing gear may include two or more wheels. For example, the landing gear 104 can include an outboard wheel 110A and an inboard wheel 110B and the landing gear 106 can include an outboard wheel 112A and an inboard wheel 112B.

Figure 1:
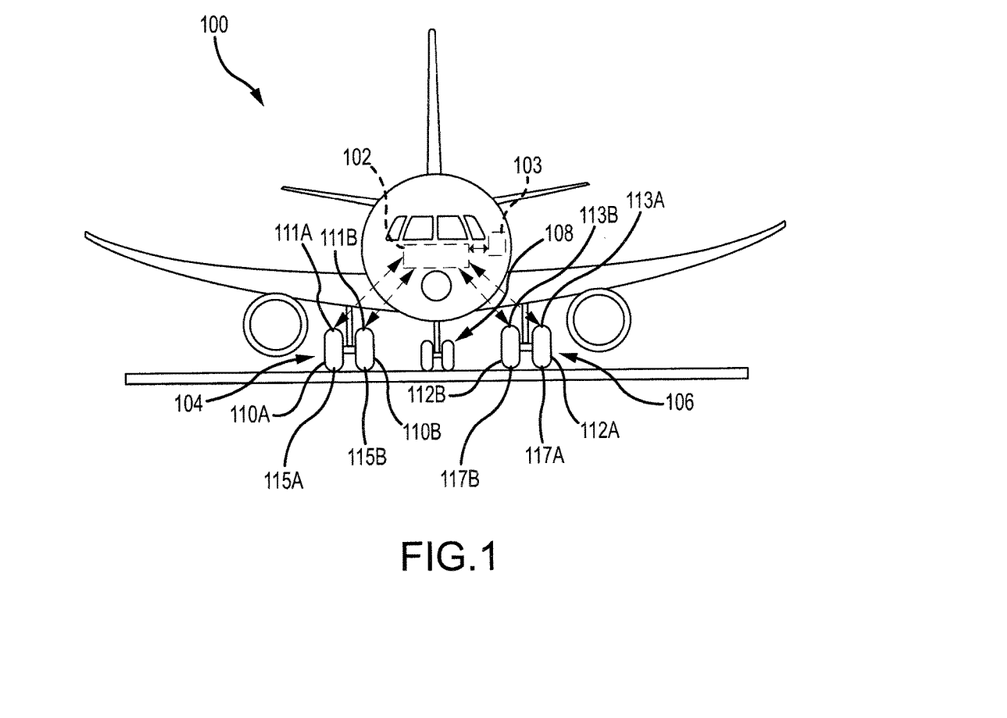
FIG. 1 is a drawing illustrating an aircraft having landing gear, in accordance with various embodiments.

The aircraft 100 may also include brakes coupled to the various wheels. For example, the outboard wheel 110A includes an outboard brake 111A, the inboard wheel 110B includes an inboard brake 111B, the inboard wheel 112B includes an inboard brake 113B, and the outboard wheel 112A includes an outboard brake 113A.

The aircraft 100 may also include a brake control unit (BCU) 102. The BCU 102 may be coupled to each of the outboard brakes 111A, 113A and the inboard brakes 111B, 113B and may control operation of the outboard brakes 111A, 113A and the inboard brakes 111B, 113B. In various embodiments, the aircraft 100 can include an auto brake feature. In that regard, a pilot of the aircraft 100 may select a desired rate of deceleration of the aircraft 100 and provide it to the BCU 102. Based on data received from various sensors, the BCU 102 can receive or determine a rate of deceleration of the aircraft 100 and change an applied amount of braking based on the detected deceleration. If the detected rate of deceleration is less than the desired rate of deceleration, the BCU 102 can control one or more of the outboard brakes 111A, 113A or the inboard brakes 111B, 113B to increase braking power. Similarly, if the rate of deceleration is greater than the desired rate of deceleration, the BCU 102 can instruct one or more of the outboard brakes 111A, 113A or the inboard brakes 111B, 113B to decrease braking power.

Figure 2:
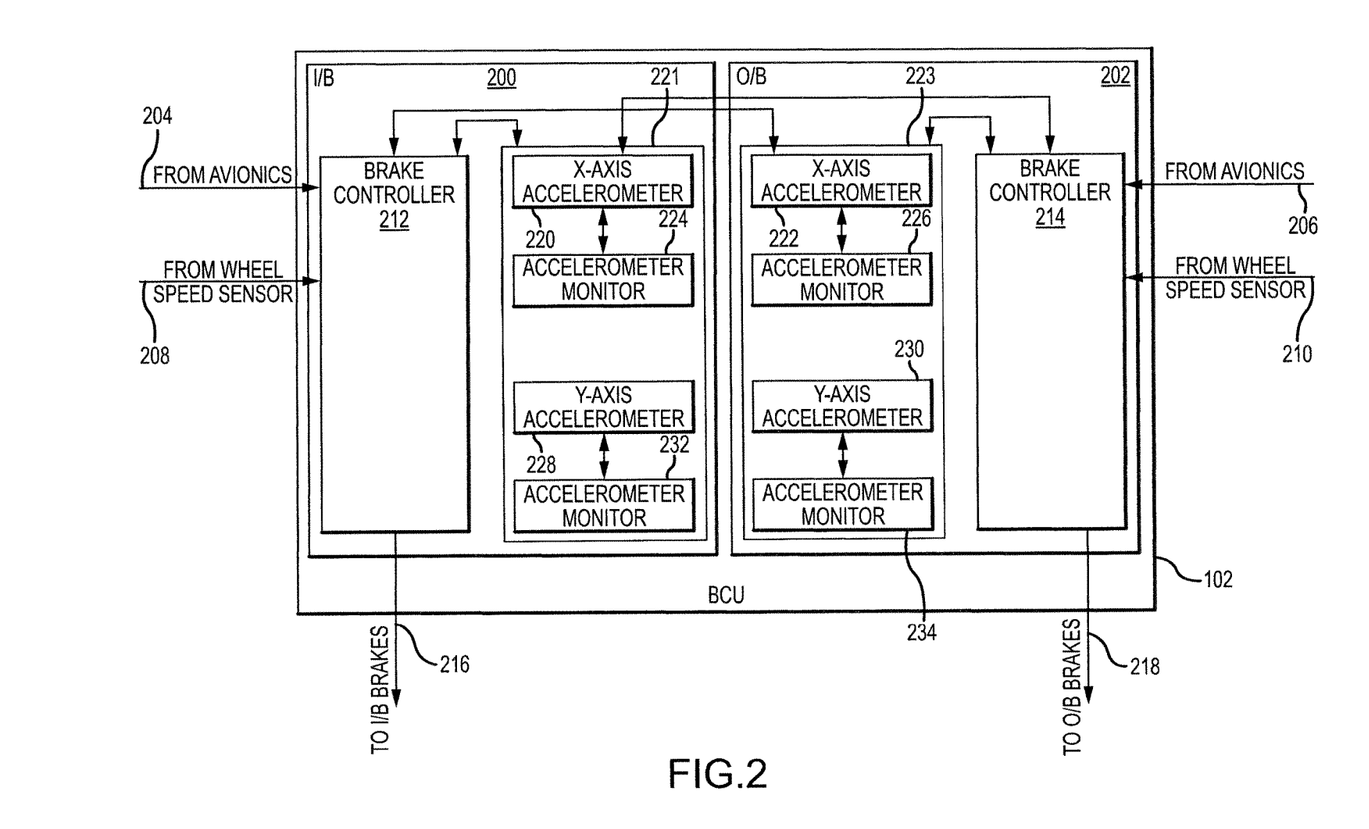
FIG. 2 is a block diagram of a brake control unit (BCU) of the aircraft of FIG. 1, in accordance with various embodiments.

In various embodiments and referring to FIGS. 1 and 2, the BCU 102 in accordance with various embodiments can include two or more BCU cards including an inboard card 200 and an outboard card 202. In various embodiments, a BCU can include a primary card and an alternate card, a single card, or any other configuration of BCU cards, instead of an inboard card and an outboard card. The inboard card 200 of the BCU 102 can control the inboard brakes 111B, 113B and the outboard card 202 can control the outboard brakes 111A, 113A.

The inboard card 200 can receive avionics deceleration data 204 including an avionics deceleration rate from an avionics unit 103 of the aircraft 100. In various embodiments, the avionics deceleration data 204 can be received from a component or system other than the avionics unit 103. In that regard, the avionics unit 103 can include any system or component of the aircraft 100 other than the BCU 102. The avionics deceleration data 204 can include, for example, a detected deceleration rate from a GPS unit and/or another device such as a gyroscope. The inboard card 200 can also receive wheel speed data 208 from wheel speed sensors 115B, 117B of the inboard wheels 110B, 112B, respectively. Similarly, the outboard card 202 can receive the avionics deceleration data 206 including an avionics deceleration rate from the avionics unit 103 and can receive wheel speed data 210 from wheel speed sensors 115A, 117A of the outboard wheels 110A, 112A, respectively. In various embodiments, the avionics deceleration data 204, 206 can include the same data, for example, received via a channel or a bus.

The inboard card 200 can include an inboard brake controller 212 and the outboard card 202 can include an outboard brake controller 214. The inboard brake controller 212 and the outboard brake controller 214 may each include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

The inboard brake controller 212 can transmit brake control data 216 to the inboard brakes 111B, 113B in order to control operation of the inboard brakes 111B, 113B. Similarly, the outboard brake controller 214 can transmit brake control data 218 to the outboard brakes 111A, 113A in order to control operation of the outboard brakes 111A, 113A. In that regard, the inboard brake controller 212 can determine an amount of braking to apply to the inboard brakes 111B, 113B (via transmission of the brake control data 216) based on avionics deceleration data 204 received from the avionics unit and/or based on the wheel speed data 208 from the wheel speed sensors. For example, the inboard brake controller 212 can determine a rate of deceleration based on two or more detected wheel speeds from the wheel speed sensors. Similarly, the outboard brake controller 214 can receive avionics deceleration data 206 and can determine a wheel speed deceleration rate based on the wheel speed data 210.

The avionics deceleration data 204, 206 may be more accurate than the wheel speed deceleration rate. However, situations can arise in which the avionics deceleration data 204, 206 may be incorrect. For example, a GPS unit from which the avionics deceleration data 204, 206 is received may malfunction and not provide any deceleration data, a monitoring circuit may indicate that the GPS unit is experiencing a fault, or the GPS unit may provide incorrect avionics deceleration data 204, 206 for any reason. In this situation, the inboard brake controller 212 and the outboard brake controller 214 can use the wheel speed data 208, 210 from the wheel speed sensors 115A, 115B, 117A, 117B to determine the wheel speed deceleration rate. However, it is desirable for the wheel speed deceleration rate to be based on data from all four of the wheel speed sensors 115A, 115B, 117A, 117B. Thus, if the avionics deceleration data 204, 206 is incorrect and one or more of the wheel speed sensors is not providing data, then the automatic deceleration program of the BCU 102 may be disabled, which can place undesirable stress on the pilots of the aircraft 100.

The BCU 102 can include one or more accelerometers in order to increase robustness of the automated deceleration program. In particular, the inboard card 200 can include a first accelerometer 221 having a first X-axis accelerometer 220, and the outboard card 202 can include a second accelerometer 223 having a first X-axis accelerometer 220. As shown in FIG. 2, the first X-axis accelerometer 220 is positioned on the inboard card 200. However, in various embodiments, the first X-axis accelerometer 220 may be positioned external to the inboard card 200 and connected to the inboard card 200 via a wire, cable, bus or the like. Likewise, the second X-axis accelerometer 222 may be positioned on or external to the outboard card 202.

Figure 3:
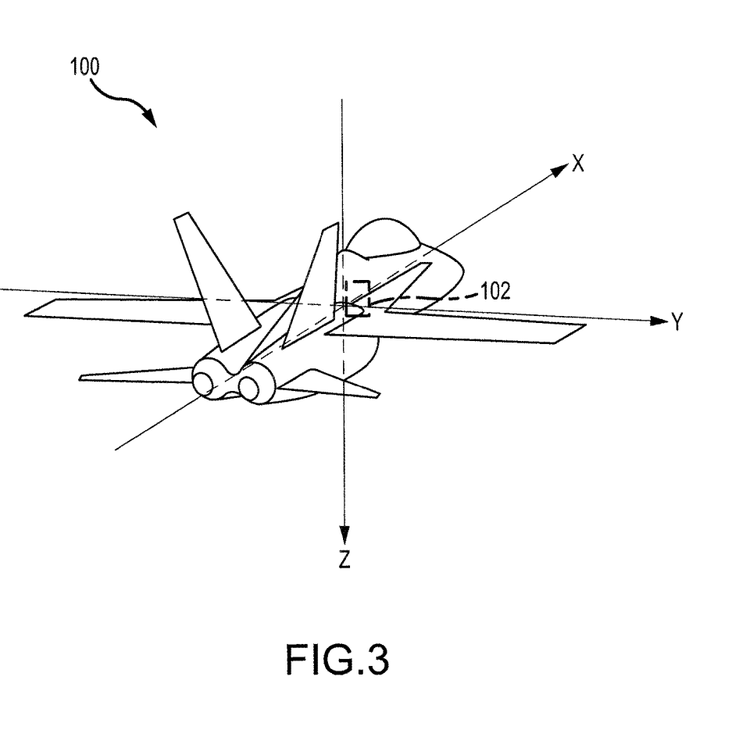
FIG. 3 is a drawing showing a perspective view of the aircraft of FIG. 1, in accordance with various embodiments.

With brief reference to FIGS. 2 and 3, the X-axis accelerometers 220, 222 can detect first and second accelerometer deceleration rates, respectively, of the aircraft 100 along the X-axis (i.e., a forward deceleration rate). The X-axis extends from the aft, or rear, end of the aircraft 100 to the forward end of the aircraft 100, corresponding to the nose of the aircraft 100. Deceleration during a landing is typically measured along the X-axis. Thus, the first and second accelerometer deceleration rates from the X-axis accelerometers 220, 222 may be used by the inboard brake controller 212 and the outboard brake controller 214 instead of or in addition to the avionics deceleration data 204, 206 and the wheel speed deceleration rate.

Returning reference to FIG. 2, the inboard brake controller 212 can also determine the brake control data 216 based on the first accelerometer deceleration rate from the first X-axis accelerometer 220. In a similar aspect, the outboard brake controller 214 can determine the brake control data 218 based on the second accelerometer deceleration rate received from the second X-axis accelerometer 222.

In that regard, the inboard brake controller 212 can detect or determine a current deceleration rate based on data from one or more of the avionics deceleration data 204, the wheel speed acceleration data, the first accelerometer deceleration rate from the first X-axis accelerometer 220 and the second accelerometer deceleration rate from the second X-axis accelerometer 222. The outboard brake controller 214 can likewise determine or detect a deceleration rate based on one or more of the avionics deceleration data 206, the wheel speed deceleration rate, the first accelerometer deceleration rate from the second X-axis accelerometer 222 and the second accelerometer deceleration rate from the first X-axis accelerometer 220.

In various embodiments, the inboard brake controller 212 compares the avionics deceleration data 204 and the first and second accelerometer deceleration rates detected by the first X-axis accelerometer 220 and the second X-axis accelerometer 222. The inboard brake controller 212 may include a voting scheme for determining which deceleration rate to use (i.e., which deceleration rate on which to base braking force application). The voting scheme can be based on a hierarchy of the sources of deceleration rates and can include, for example, if one deceleration rate is greater than 10% different than the other two deceleration rates and the other two deceleration rates are within 10% of each other, then an average of the two similar deceleration rates are used as the deceleration rate. As another example, the voting scheme can include taking an average of all deceleration rates that are within a predetermined rate of each other, such as within 0.5 meters per second squared m/s$^2$ (4026 miles per hour squared (4026 miles/h$^2$)).

For example, if the first X-axis accelerometer 220 and the second X-axis accelerometer 222 both provide an accelerometer deceleration rate of 10 m/s$^2$, (80,529 miles/h$^2$) and the avionics deceleration data 204 includes an avionics deceleration rate of 15 m/s$^2$ (80,529 miles/h2), then the inboard brake controller 212 can use the deceleration rates of 10 m/s$^2$ (80,529 miles/h$^2$) because two of the three received deceleration rates indicate that the actual deceleration rate is 10 m/s$^2$ (80,529 miles/h$^2$). Similarly, if the avionics deceleration data 204 and the first accelerometer deceleration rate of the first X-axis accelerometer 220 indicate that the deceleration rate is 10 m/s$^2$ (80,529 miles/h$^2$) while the second accelerometer deceleration rate of the second X-axis accelerometer 222 indicates that the deceleration is 15 m/s$^2$ (80,529 miles/h$^2$), the inboard brake controller 212 may determine that the actual deceleration rate is 10 m/s$^2$(80,529 miles/h$^2$).

The inboard card 200 can also include a first accelerometer monitor 224. The first accelerometer monitor 224 may include a circuit and/or software configured to determine operational data of the first X-axis accelerometer 220 (i.e., whether the first X-axis accelerometer 220 is functioning properly). The operational data of the first X-axis accelerometer 220 (including whether the accelerometer deceleration rate provided by the first X-axis accelerometer 220 is valid) may be provided to the inboard brake controller 212 such that the inboard brake controller 212 can determine whether or not to use data detected by the first X-axis accelerometer 220 based on the operational data. Similarly, the inboard brake controller 212 may also receive operational data from a second accelerometer monitor 226 of the outboard card 202 in order to determine whether to use data from the second X-axis accelerometer 222. In a situation in which the avionics deceleration data 204 and the first and second accelerometer deceleration rates from the X-axis accelerometers 220, 222 are unreliable, the inboard brake controller 212 may still control the automatic deceleration program using a wheel speed deceleration rate based on the wheel speed data 208.

The acceleration rates can be determined to be unreliable in a variety of manners. For example, a monitoring circuit of the avionics unit may determine that the avionics deceleration data is unreliable and transmit the data along with or in place of the avionics deceleration data. The accelerometer monitors can likewise determine and transmit this data. In another aspect, the inboard brake controller 212 and/or the outboard brake controller 214 can compare the received values to a range of possible deceleration values and determine that the value is unreliable if the received value falls outside of the range. For example, if the avionics deceleration rate is 1,000,000 m/s$^2$ (8,052,970,651 miles/h$^2$), the board brake controller 212 and/or the outboard brake controller 214 can decide that the avionics deceleration rate is unreliable.

Use of the X-axis accelerometers 220, 222 provides several benefits and advantages. For example, the X-axis accelerometers 220, 222 provide increased robustness as the inboard brake controller 212 and the outboard brake controller 214 can still receive valid deceleration data when the avionics deceleration data 204, 206 from the avionics unit and the wheel speed data 208, 210 is unreliable. Additionally, when avionics deceleration data 204, 206 is being received, the accelerometer deceleration rates from the X-axis accelerometers 220, 222 can be used to verify the accuracy of the avionics deceleration data 204.

Again referring briefly to FIGS. 2 and 3, the first accelerometer 221 can also include a first Y-axis accelerometer 228 for detecting acceleration along the Y-axis, or an axis parallel to a wingspan of the aircraft 100. Returning reference to FIG. 2, the first accelerometer 221 can include two single-axis accelerometers and/or one two-axis accelerometer. The inboard card 200 can also include an accelerometer monitor 232 for detecting a status of the first Y-axis accelerometer 228. The second accelerometer 223 can include a second Y-axis accelerometer 230 and an accelerometer monitor 234. Use of the first and second acceleration data along the Y-axis by the inboard brake controller 212 may increase the accuracy of the accelerometer deceleration rate. As the aircraft 100 decelerates along a runway, wind or other factors may cause the aircraft 100 to accelerate along the Y-axis. In various embodiments, the first accelerometer deceleration rate can be based on a combination of data from the first X-axis accelerometer 220 and data from the first Y-axis accelerometer 228. Likewise, the second accelerometer deceleration rate can be based on a combination of data from the second X-axis accelerometer 222 and data from the second Y-axis accelerometer 230. The inboard brake controller 212 may then use the data from the X-axis accelerometers 220, 222 and the data from the Y-axis accelerometers 228, 230 to determine a deceleration rate having a relatively high accuracy.

Figure 4:
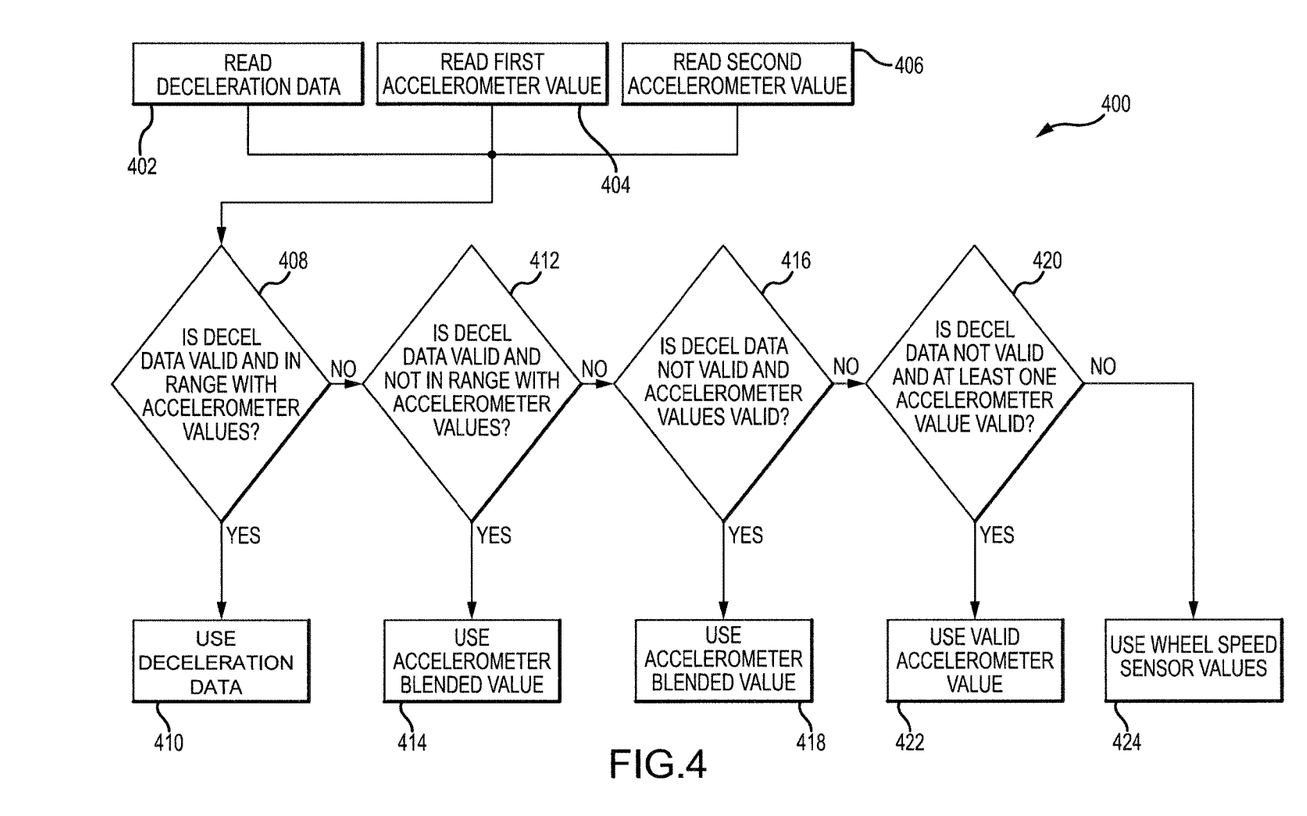
FIG. 4 is a flow chart illustrating a method for determining a deceleration rate of an aircraft, in accordance with various embodiments.

With reference to FIG. 4, a method 400 in accordance with various embodiments may be used by an aircraft similar to the aircraft 100 in order to detect or determine a deceleration rate of the aircraft. The aircraft may include a BCU similar to the BCU 102 of FIG. 2, and the method 400 may be performed by one or more brake controllers similar to the inboard brake controller 212 and the outboard brake controller 214. Each of the brake controllers may be positioned on a separate card of the BCU.

In block 402, a first brake controller may receive and/or read an avionics deceleration rate from a bus. The avionics deceleration rate may be received from an avionics or other unit of the aircraft and may have been detected by a GPS unit, a gyroscope or the like.

In block 404, the first brake control unit may receive and/or read a first accelerometer deceleration rate from a first accelerometer. In various embodiments, the first accelerometer may be positioned on the same card as the first brake controller and/or may be positioned external to the card. In various embodiments, the first accelerometer deceleration rate from the first accelerometer may be received via a wire, cable or bus.

In block 406, the first brake controller may receive and/or read a second accelerometer deceleration rate from a second accelerometer. The second accelerometer may be positioned on the same card as the first brake controller and/or may be positioned external to the card, such as on a second card of the BCU. In various embodiments, the second accelerometer deceleration rate from the second accelerometer may be received via a wire, cable or bus.

In block 408, the first brake controller may determine whether the avionics deceleration rate received in block 402 is valid. If the data is valid, the first brake controller may compare the avionics deceleration rate to the accelerometer deceleration rates from the first accelerometer and the second accelerometer to verify that all three values are similar.

In order to determine whether the avionics deceleration rate is valid, the first brake controller can receive data from a circuit that is monitoring the source of the deceleration data (such as a monitor circuit for a GPS unit). If the data from the circuit indicates that the avionics deceleration rate is valid, the first brake controller may then compare the avionics deceleration rate to the accelerometer deceleration rates of the accelerometers that was received in blocks 404 and 406.

In order to determine whether all deceleration rates are in the same range (i.e., determining whether each of the deceleration rates is accurate), the first brake controller may determine whether each of the deceleration rates are similar. For example, the first brake controller may determine whether each of the values are near each other, such as within 10%, or 5%, or 2% of each other.

In block 410, if the avionics deceleration rate is valid (known based on data received from the avionics unit or whether the deceleration rate is possible) and in range (based on a comparison with the accelerometers) with the accelerometer deceleration rates, the brake control unit may use the avionics deceleration data from the avionics unit. Thus, the brake control unit may have determined that the avionics deceleration rate is the likely actual deceleration rate.

In block 412, the first brake controller may determine whether the deceleration data values are not in the same range. For example, the first brake controller may determine that the avionics deceleration rate is not in the same range as the accelerometer deceleration rates from the accelerometers if the accelerometer deceleration rates from the two accelerometers are within 10% of each other and the avionics deceleration rate is not within 10% of the accelerometer deceleration rates.

If the accelerometer deceleration rates are in the same range and the avionics deceleration rate from the avionics unit is not, the first brake controller can use the accelerometer deceleration rates from the accelerometers in block 414. Thus, the brake control unit may have determined that at least one of the accelerometer deceleration rates is the likely actual deceleration rate. In various embodiments, the brake control unit may use a deceleration rate that is an average of the accelerometer deceleration rates from the two accelerometers and, in various embodiments, it may use an accelerometer deceleration rate from one of the accelerometers.

In block 416, the brake control unit may determine whether the avionics deceleration data is invalid based on data received from a monitoring circuit and whether the accelerometer deceleration rates from the accelerometers are valid. If so, the brake control unit may use the accelerometer deceleration rates from the accelerometers in block 418 and, in various embodiments, may use the data from one or both accelerometers as described above. Thus, the brake control unit may have determined that at least one of the accelerometer deceleration rates is the likely actual deceleration rate.

In block 420, the brake control unit determines whether the avionics deceleration rate from the avionics unit is invalid and an accelerometer deceleration rate from at least one accelerometer is valid. If so, the brake control unit may use the accelerometer deceleration rate from the valid accelerometer in block 422. Thus, in block 422, the brake control unit may have determined that the accelerometer deceleration rate from the valid accelerometer is the likely actual deceleration rate. However, if the avionics deceleration rate and the accelerometer deceleration rates from both accelerometers are invalid, then the brake control unit may use a wheel speed deceleration rate based on wheel speed data received from the wheel speed sensors in block 424. Thus, in block 424, the brake control unit may have determined that the wheel speed deceleration rate is the likely actual deceleration rate.

Thus, in summary, the brake control unit determines a hierarchy of deceleration rates between the avionics deceleration rate, the accelerometer deceleration rates and the wheel speed deceleration rate. The brake control unit also determines a likely accurate deceleration rate based on the hierarchy and the values of the different deceleration rates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for determining an accepted deceleration rate of an aircraft comprising:
   an avionics unit capable of transmitting an avionics deceleration rate, the avionics unit having an avionics monitor circuit configured to transmit avionics operational data that indicates the avionics deceleration rate is either valid or invalid;
   at least two wheel speed sensors configured to output wheel speed data including a wheel speed of a corresponding wheel;
   a brake control unit comprising:
      a first brake control unit card having a first accelerometer configured to detect a first accelerometer deceleration rate and having a first brake controller configured to transmit first accelerometer operational data that indicates the first accelerometer deceleration rate is either valid or invalid; and
      a second brake control unit card having a second accelerometer configured to detect a second accelerometer deceleration rate and a second brake controller configured to transmit second accelerometer operational data that indicates the second accelerometer deceleration rate is ether valid or invalid,
      wherein the brake control unit is in operable communication with the avionics unit and the at least two wheel speed sensors, the brake control unit configured to:
         determine a wheel speed deceleration rate based on the wheel speed data; and
         determine the accepted deceleration rate of the aircraft to be used by the brake control unit according to one of the following options A through G:
            A) if the avionics deceleration rate is valid, the first accelerometer deceleration rate is invalid, and the second accelerometer deceleration rate is invalid, then the accepted deceleration rate is the avionics deceleration rate;
            B) if the avionics deceleration rate is invalid, the first accelerometer deceleration rate is invalid, and the second accelerometer deceleration rate is invalid, then then the accepted deceleration rate is the wheel speed deceleration rate;
            C) if the avionics deceleration rate is invalid, the first accelerometer deceleration rate is valid, and the second accelerometer deceleration rate is invalid, then the accepted deceleration rate is the wheel speed deceleration rate;
            D) if the avionics deceleration rate is invalid, the first accelerometer deceleration rate is invalid, and the second accelerometer deceleration rate is valid, then the accepted deceleration rate is the wheel speed deceleration rate;
            E) if the avionics deceleration rate is valid, the first accelerometer deceleration rate is valid, and the second accelerometer deceleration rate is valid, then;
               determine whether or not the avionics deceleration rate is within a predetermined threshold percentage of both the first accelerometer deceleration rate and the second accelerometer deceleration rate,
               if so, the accepted deceleration rate is the avionics deceleration rate;
               if not, determine whether or not the avionics deceleration rate is within a predetermined threshold percentage of one of the first accelerometer deceleration rate and the second accelerometer deceleration rate,
               if so, determine whether or not the first accelerometer deceleration rate and the second accelerometer deceleration rate are within a predetermined threshold percentage of each other,
               if so, the accepted deceleration rate is an average between the avionics deceleration rate and the one of the first accelerometer deceleration rate and the second accelerometer deceleration rate that the avionics deceleration rate was within the predetermined threshold percentage of;
               if not, the accepted deceleration rate is the wheel speed deceleration rate;
               if not, determine whether or not the first accelerometer deceleration rate and the second accelerometer deceleration rate are within a predetermined threshold percentage of each other,
               if so, the accepted deceleration rate is an average between the first accelerometer deceleration rate and the second accelerometer deceleration rate;
               if not, the accepted deceleration rate is the wheel speed deceleration rate;
            F) if the avionics deceleration rate is invalid, the first accelerometer deceleration rate is valid, and the second accelerometer deceleration rate is valid, then:
               determine whether or not the first accelerometer deceleration rate and the second accelerometer deceleration rate are within a predetermined threshold percentage of each other,
               if so, the accepted deceleration rate is an average between the first accelerometer deceleration rate and the second accelerometer deceleration rate;
               if not, the accepted deceleration rate is the wheel speed deceleration rate;
            G) if the avionics deceleration rate is valid, the first accelerometer deceleration rate is valid, and the second accelerometer deceleration rate is invalid, then:
               determine whether or not the avionics deceleration rate and the first accelerometer deceleration rate are within a predetermined threshold percentage of each other,
               if so, the accepted deceleration rate is an average between the avionics deceleration rate and the first accelerometer deceleration rate;
               if not, the accepted deceleration rate is the wheel speed deceleration rate;
            H) if the avionics deceleration rate is valid, the first accelerometer deceleration rate is invalid, and the second accelerometer deceleration rate is valid, then:
               determine whether or not the avionics deceleration rate and the second accelerometer deceleration rate are within a predetermined threshold percentage of each other,
               if so, the accepted deceleration rate is an average between the avionics deceleration rate and the second accelerometer deceleration rate;
               if not, the accepted deceleration rate is the wheel speed deceleration rate.

2. The system of claim 1, wherein:
the first accelerometer includes a first X-axis accelerometer configured to detect deceleration along an X-axis extending from an aft end of the aircraft to a forward end of the aircraft and a first Y-axis accelerometer configured to detect deceleration along a Y-axis parallel to a wingspan of the aircraft; and
the second accelerometer includes a second X-axis accelerometer configured to detect deceleration along the X-axis and a second Y-axis accelerometer configured to detect an acceleration along the Y-axis.

3. A method for determining an accepted deceleration rate of an aircraft comprising:
receiving, at a first brake controller located on a first brake control unit (BCU) card and from an avionics unit, an avionics deceleration rate and an avionics operational data, the avionics unit having an avionics monitor circuit;
receiving, at the first brake controller and from the avionics monitor circuit, an indication that the avionics deceleration rate is either valid or invalid based on the avionics operational data;
receiving, at the first brake controller and from a first accelerometer also located on the first BCU card, a first accelerometer deceleration rate and a first accelerometer operational data, the first BCU card having a first accelerometer monitor circuit;
receiving, at the first brake controller from the first accelerometer monitor circuit, an indication that the first accelerometer is either valid or invalid based on the first accelerometer operational data;
receiving, at the first brake controller and from a second accelerometer located on a second BCU card, a second accelerometer deceleration rate and a second accelerometer operational data, the second BCU card having a second accelerometer monitor circuit, wherein the second BCU card further includes a second brake controller;
receiving, at the second brake controller from the second accelerometer monitor circuit, an indication that the second accelerometer is either valid or invalid based on the second accelerometer operational data;
receiving, at the first brake controller and from at least two wheel speed sensors, a wheel speed of a corresponding wheel;
determining, by the first brake controller, a wheel speed deceleration rate based on the received wheel speeds of the at least two wheel speed sensors;
determining, by the first brake controller, the accepted deceleration rate of the aircraft to be used by the brake control unit according to one the following options A through G:
A) if the avionics deceleration rate is valid, the first accelerometer deceleration rate is invalid, and the second accelerometer deceleration rate is invalid, then the accepted deceleration rate is the avionics deceleration rate;
B) if the avionics deceleration rate is invalid, the first accelerometer deceleration rate is invalid, and the second accelerometer deceleration rate is invalid, then then the accepted deceleration rate is the wheel speed deceleration rate;
C) if the avionics deceleration rate is invalid, the first accelerometer deceleration rate is valid, and the second accelerometer deceleration rate is invalid, then the accepted deceleration rate is the wheel speed deceleration rate;
D) if the avionics deceleration rate is invalid, the first accelerometer deceleration rate is invalid, and the second accelerometer deceleration rate is valid, then the accented deceleration rate is the wheel speed deceleration rate;
E) if the avionics deceleration rate is valid, the first accelerometer deceleration rate is valid, and the second accelerometer deceleration rate is valid, then:
determine whether or not the avionics deceleration rate is within a predetermined threshold percentage of both the first accelerometer deceleration rate and the second accelerometer deceleration rate,
if so, the accepted deceleration rate is the avionics deceleration rate;
if not, determine whether or not the avionics deceleration rate is within a predetermined threshold percentage of one of the first accelerometer deceleration rate and the second accelerometer deceleration rate,
if so, determine whether or not the first, accelerometer deceleration rate and the second accelerometer deceleration rate are within a predetermined threshold percentage of each other,
if so, the accepted deceleration rate is an average between the avionics deceleration rate and the one of the first accelerometer deceleration rate and the second accelerometer deceleration rate that the avionics deceleration rate was within the predetermined threshold percentage of;
if not, the accepted deceleration rate is the wheel speed deceleration rate;
if not, determine whether or not the first accelerometer deceleration rate and the second accelerometer deceleration rate are within a predetermined threshold percentage of each other,
if so, the accepted deceleration rate is an average between the first accelerometer deceleration rate and the second accelerometer deceleration rate;
if not, the accepted deceleration rate is the wheel speed deceleration rate;
F) if the avionics deceleration rate is invalid, the first accelerometer deceleration rate is valid, and the second accelerometer deceleration rate is valid, then:
determine whether or not the first accelerometer deceleration rate and the second accelerometer deceleration rate are within a predetermined threshold percentage of each other,
if so, the accented deceleration rate is an average between the first accelerometer deceleration rate and the second accelerometer deceleration rate;
if not, the accepted deceleration rate is the wheel speed deceleration rate;
G) if the avionics deceleration rate is valid, the first accelerometer deceleration rate is valid, and the second accelerometer deceleration rate is invalid, then:
determine whether or not the avionics deceleration rate and the first accelerometer deceleration rate are within a predetermined threshold percentage of each other,
if so, the accepted deceleration rate is an average between the avionics deceleration rate and the first accelerometer deceleration rate;

if not, the accepted deceleration rate is the wheel speed deceleration rate;
H) if the avionics deceleration rate is valid, the first accelerometer deceleration rate is invalid, and the second accelerometer deceleration rate is valid, then:
determine whether or not the avionics deceleration rate and the second accelerometer deceleration rate are within a predetermined threshold percentage of each other,
if so, the accepted deceleration rate is an average between the avionics deceleration rate and the second accelerometer deceleration rate;
if not, the accepted deceleration rate is the wheel speed deceleration rate.

4. A brake control unit (BCU) for use with an aircraft, comprising:
a first brake control unit (BCU) card having:
a first accelerometer configured to detect a first accelerometer deceleration rate, and
a first brake controller; and
a second BCU card having:
a second accelerometer configured to detect a second accelerometer deceleration rate, and
a second brake controller configured to:
receive an avionics deceleration rate from an avionics unit of the aircraft, the avionics unit having an avionics monitor circuit configured to transmit an indication that the avionics deceleration rate is either valid or invalid,
receive wheel speed data from at least two wheel speed sensors of the aircraft, the wheel speed data including a wheel speed of a corresponding wheel,
determine a wheel speed deceleration rate based on the wheel speed data,
receive the first accelerometer deceleration rate and the second accelerometer deceleration rate,
determine whether the first accelerometer deceleration rate is either valid or invalid,
determine whether the second accelerometer deceleration rate is either valid or invalid,
determine an accepted deceleration rate of the aircraft to be used by the second brake controller, and
generate brake control data for controlling brakes of the aircraft based on the accepted deceleration rate determined by the second brake controller;
wherein the accepted deceleration rate is determined according to one of the following options A through G:
A) if the avionics deceleration rate is valid, the first accelerometer deceleration rate is invalid, and the second accelerometer deceleration rate is invalid, then the accepted deceleration rate is the avionics deceleration rate;
B) if the avionics deceleration rate is invalid, the first accelerometer deceleration rate is invalid, and the second accelerometer deceleration rate is invalid, then then the accepted deceleration rate is the wheel speed deceleration rate;
C) if the avionics deceleration rate is invalid, the first accelerometer deceleration rate is valid, and the second accelerometer deceleration rate is invalid, then the accepted deceleration rate is the wheel speed deceleration rate;
D) if the avionics deceleration rate is invalid, the first accelerometer deceleration rate is invalid, and the second accelerometer deceleration rate is valid, then the accepted deceleration rate is the wheel speed deceleration rate:
E) if the avionics deceleration rate is valid, the first accelerometer deceleration rate is valid, and the second accelerometer deceleration rate is valid, then:
determine whether or not the avionics deceleration rate is within a predetermined threshold percentage of both the first accelerometer deceleration rate and the second accelerometer deceleration rate,
if so, the accepted deceleration rate is the avionics deceleration rate;
if not, determine whether or not the avionics deceleration rate is within a predetermined threshold percentage of one of the first accelerometer deceleration rate and the second accelerometer deceleration rate,
if so, determine whether or not the first accelerometer deceleration rate and the second accelerometer deceleration rate are within a predetermined threshold percentage of each other,
if so, the accepted deceleration rate is an average between the avionics deceleration rate and the one of the first accelerometer deceleration rate and the second accelerometer deceleration rate that the avionics deceleration rate was within the predetermined threshold percentage of;
if not, the accepted deceleration rate is the wheel speed deceleration rate;
if not, determine whether or not the first accelerometer deceleration rate and the second accelerometer deceleration rate are within a predetermined threshold percentage of each other,
if so, the accepted deceleration rate is an average between the first accelerometer deceleration rate and the second accelerometer deceleration rate;
if not, the accepted deceleration rate is the wheel speed deceleration rate;
F) if the avionics deceleration rate is invalid, the first accelerometer deceleration rate is valid, and the second accelerometer deceleration rate is valid, then:
determine whether or not the first accelerometer deceleration rate and the second accelerometer deceleration rate are within a predetermined threshold percentage of each other,
if so, the accepted deceleration rate is an average between the first accelerometer deceleration rate and the second accelerometer deceleration rate;
if not the accepted deceleration rate is the wheel speed deceleration rate;
G) if the avionics deceleration rate is valid, the first accelerometer deceleration rate is valid, and the second accelerometer deceleration rate is invalid, then:
determine whether or not the avionics deceleration rate and the first accelerometer deceleration rate are within a predetermined threshold percentage of each other,
if so, the accepted deceleration rate is an average between the avionics deceleration rate and the first accelerometer deceleration rate;

if not, the accepted deceleration rate is the wheel speed deceleration rate;

H) if the avionics deceleration rate is valid, the first accelerometer deceleration rate is invalid, and the second accelerometer deceleration rate is valid, then:

determine whether or not the avionics deceleration rate and the second accelerometer deceleration rate are within a predetermined threshold percentage of each other, if so, the accepted deceleration rate is an average between the avionics deceleration rate and the second accelerometer deceleration rate;

if not, the accented deceleration rate is the wheel speed deceleration rate.

* * * * *